Patented Nov. 16, 1948

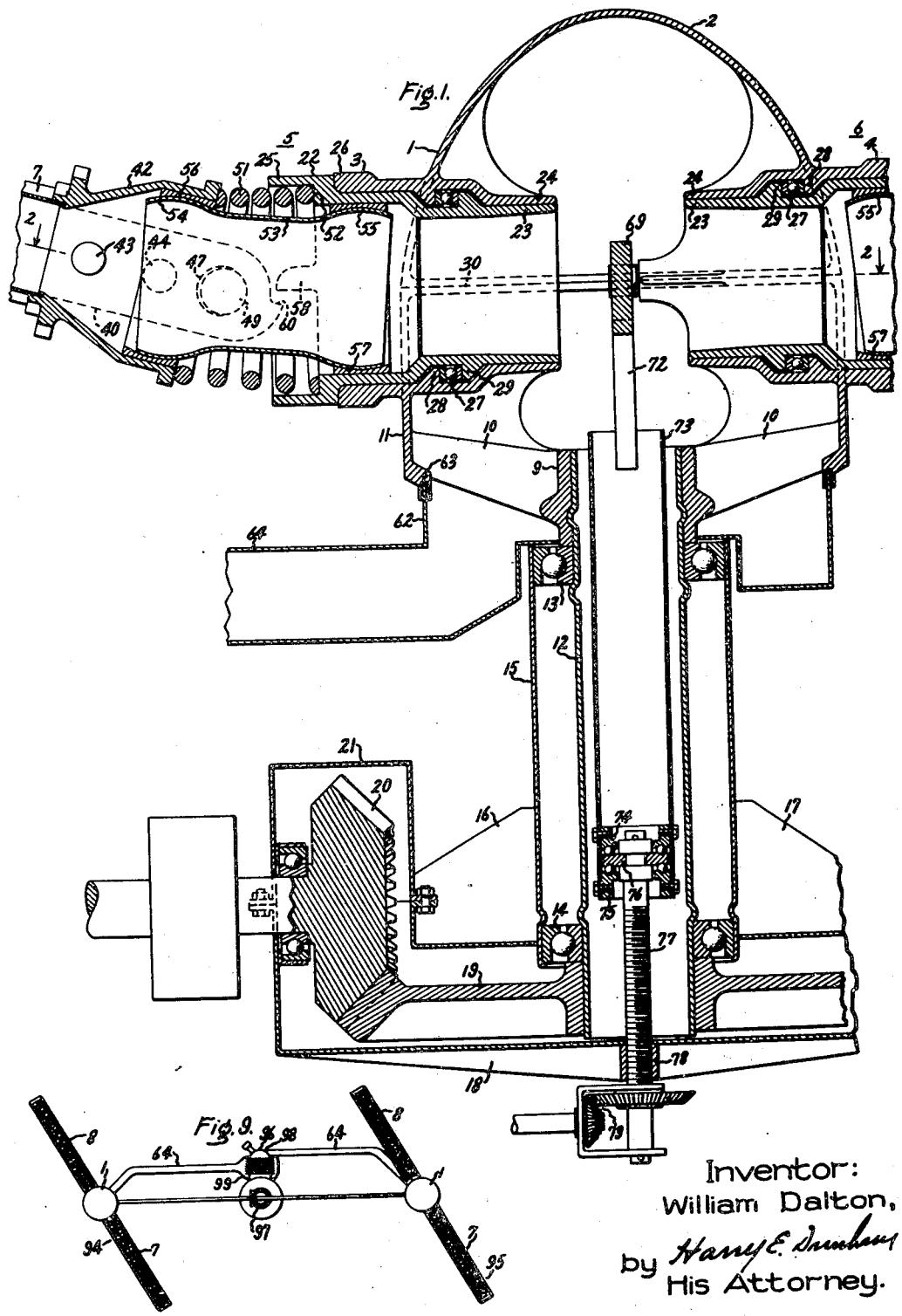

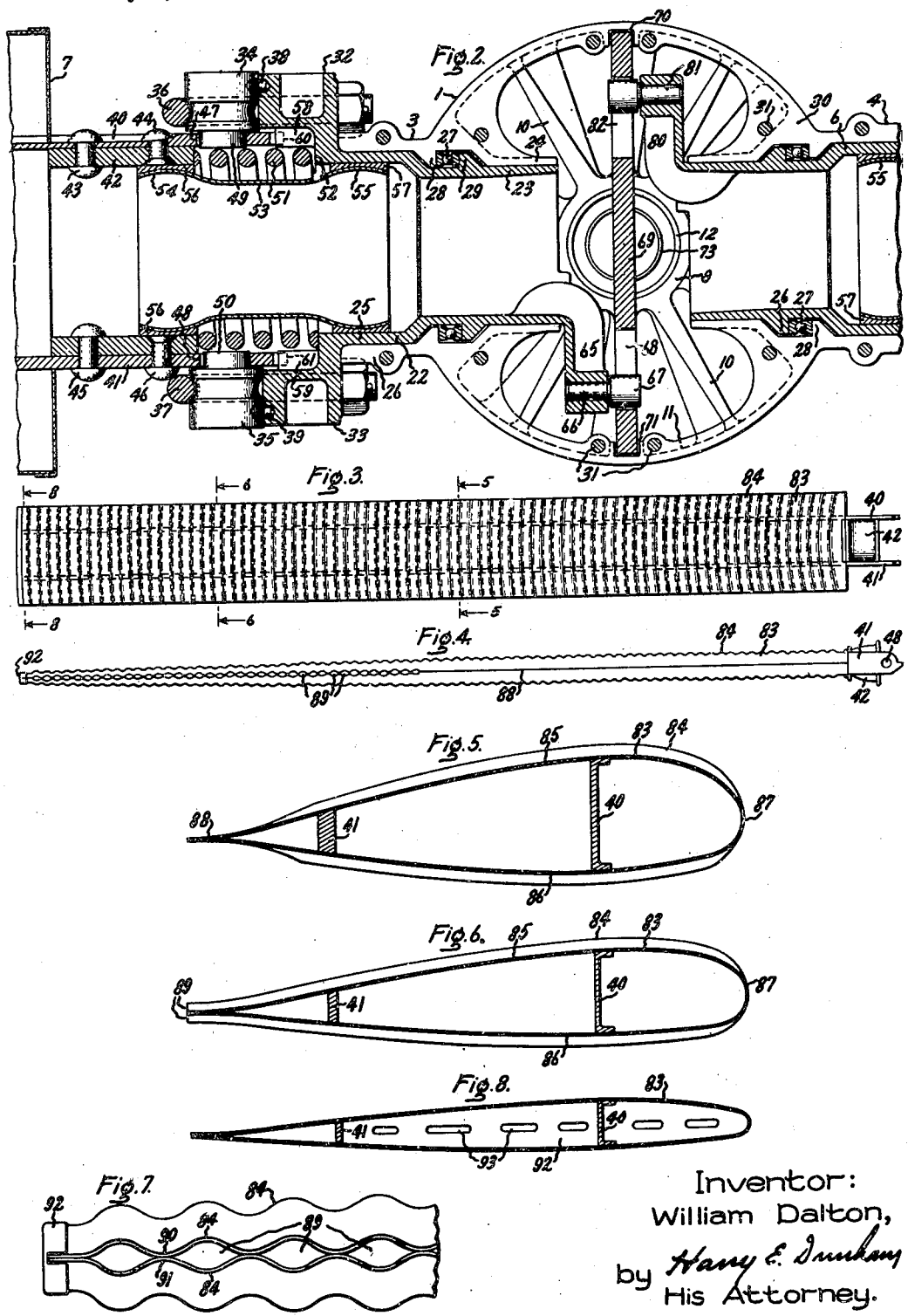

2,454,040

UNITED STATES PATENT OFFICE 2,454,040

AIRCRAFT PROPELLER

William Dalton, Schenectady, N. Y., assignor to General Electric Company, a corporation of New York Application July 7, 1944, Serial No. 543,771

17 Claims. (Cl. 170—135.6)

This invention relates to aircraft propellers, and particularly to an improved hollow lightweight propeller for lifting and propelling the aircraft and increasing the blade efficiency.

The improved propeller may be used on any type of aircraft although the improvements of the present invention are of particular advantage in aircraft that ascend and descend substantially vertically like a helicopter and also fly in level flight with the axis of the propeller extending substantially in the line of flight.

One of the objects is to provide an improved propeller having lightweight, hollow, centrifugally tensioned, variable pitch pivoted blades suitable for both helicopter and airplane propelling action.

A further object is to provide the propeller with an improved rotor hub and variable pitch, pivoted blade, flexible articulation structure.

Another object is to provide a flexibly articulated propeller rotor hub and variable pitch pivoted blade structure capable of providing internal gas flow conduits through which hot gases such for example as the driving engine exhaust or gases from any other source may flow to produce a jet discharge from the trailing edge of the blade adjacent the blade tip.

A still further object is to provide the hollow propeller rotor hub with an improved form of internal articulation control mechanism for enabling the pitch of the centrifugally tensioned flexible pivoted blades to be varied as required in controlling the flight of the aircraft.

A specific object is to provide an improved lightweight hollow conduit construction for the rotating propeller blade wherein a relatively thin lightweight surface skin is carried by a pair of tension members to enable the skin to be substantially free of centrifugal tension strain. Thus the thin skin may be specially corrugated transverse the tension member both for strength and to provide a series of jet discharge openings adjacent the tip of the blade.

Further objects and advantages of the invention will appear in the following description of the accompanying drawings in which Fig. 1 is a cross sectional view of a double blade, articulated hollow propeller rotor embodying the improvements of the present invention in a preferred form; Fig. 2 is a top sectional view of the propeller rotor construction shown in Fig. 1; Figs. 3, 4, 5, 6, 7 and 8 show the details of an improved lightweight hollow conduit form of rotating blade construction capable of cooperating with the articulated rotor of Figs. 1 and 2 in lifting and propelling the aircraft; and Fig. 9 shows diagrammatically an improved dual propeller, single engine driven aircraft power plant embodying the improvements of the present invention.

As shown in Fig. 1, the hub 1 of the improved articulated propeller rotor is in the form of an internally ribbed, relatively thin walled, lightweight, hollow conoidal casing, preferably cast of a suitable material of light weight and high tensile strength, to provide a semi-spherical nose portion 2 and two diametrically opposing sockets 3 and 4, for carrying the multiple articular connections 5 and 6 for two similar but oppositely extending variable pitch pivoted blades 7 and 8 of the propeller. Only one blade 7 is partially shown in Figs. 1 and 2 but both blades are similarly constructed as shown in Figs. 3 to 7. The hollow hub casing 1 is provided with an axial mounting ring 9 that is connected by a plurality of radial supporting ribs or vanes 10 with the cylindrical side walls 11 of the hub casing 1. The ribs or vanes 10 preferably are axially skewed as shown in Fig. 2 so as to constitute an axial flow fan or blower for accelerating the flow of gases through the spaces therebetween into the hub 1.

The hub mounting ring 9 is secured to the end of the hollow, lightweight propeller tubular drive shaft 12 by suitable means, preferably by welding. The drive shaft 12 is rotatably supported to transmit the propeller lifting and propelling forces, preferably by anti-friction means such as the ball thrust bearing units 13 and 14 which, as shown, have their inner races carried by the drive shaft 12 and their outer races seated inside the propeller mounting tube 15. Suitable supporting brackets 16, 17 and base plate 18 may be provided for anchoring the propeller mounting tube 15 in the aircraft structure.

Driving power may be transmitted to the tubular propeller shaft 12 by any suitable means, such as the beveled driving gears 19 and 20 shown, preferably enclosed within a suitable housing 21.

The multiple articular blade connections 5 carried in the socket 3, as shown in Fig. 1, comprise a hollow, lightweight stub shaft 22 having the inner bearing portion 23 rotatably supported within the inwardly extended portion 24 of the socket 3 and an outer bearing portion 25 of enlarged diameter, as shown, rotatably supported within the outwardly extending portion 26 of the socket 3. A ball thrust bearing unit 27 is interposed between the thrust shoulder 28 with which the socket 3 is provided and the thrust shoulder 29 with which the stub shaft 22 is provided in order to carry the heavy centrifugal thrust produced upon rotation of the propeller at relatively high speed. The hub casing 1 is provided with a longitudinally split joint 30 in alignment with the axis of the stub shaft 22, and the two parts thereof are removably secured together by suitable holding bolts 31 in order to permit removal of the hub nose portion 2 for assembly and servicing of the rotor parts.

As more clearly shown in the top sectional view of Fig. 2 along the split joint dividing line 2—2 of Fig. 1, the stub shaft 22 is provided at the outer end thereof with the opposing brackets 32, 33 to which are removably secured the pivot pins 34, 35 by means of the U bolts 36, 37 and the dowel alignment pins 38, 39.

A pair of blade centrifugal tension members 40 and 41 preferably in the form of tapered relatively stiff metal beams as shown extends through and inwardly from the blade 7 and are held securely in aligned spaced apart relation on opposite sides of the blade centrifugal tension transfer truss and flow inlet bell conduit 42 by rivets 43, 44, 45, 46. The inner ends of the tension members 40 and 41 are provided with pivot bearing apertures or holes 47, 48 of substantially larger diameter than the cooperating pivot bearings 49 and 50 so as to obtain considerable lost motion in each pivotal mounting for the blade 7 of the propeller. This results in a pair of spaced apart axially aligned pivot bearing connections each capable of carrying the entire centrifugal tension of the blade 7 and having a predetermined lateral flexibility when the compression spring 51 is interposed under a predetermined strain between the shoulder 52 on the stub shaft 22 and the inner end of the blade bell tube 42. The compression spring 51 serves to oppose and resiliently take up each pivot bearing lost motion as the blade tension is transferred from each pivot bearing to the other. Thus an appreciable range of controlled and cushioned lateral tilting movement of the rotating blade about each pivot bearing with respect to the other pivot bearing is obtained. This resilient double pivot lost motion take-up and tension transfer construction is of material advantage in cushioning and damping the rotational flutter or circumferential oscillation strains to which the rotating blade may be subjected during flight.

In order to interconnect the stub shaft 22 with the blade bell conduit 42 for flow of gases therebetween, an interconnecting tube 53 is formed with ball sections 54, 55 which have a sliding fit with the spherically concave sliding bushings 56, 57 so as to form a substantially sealed but articulated gas flow telescoping conduit connection from the rotor head to the blade. In this way the hollow blade 7 is provided with a double ball jointed telescoping flow connection with the stub shaft tube 22. To limit the angular movement of the blade 7 in only one direction about the pivots 49, 50, particularly when the propeller is stationary or rotating with negative blade pitch, the stub shaft 22 is provided with a pair of projecting stops 58, 59 for engaging with the shoulders 60, 61 formed on the corresponding blade tension members 40 and 41.

A gas flow connection is provided between the periphery of the conoidal propeller hub casing 1 and a coaxial cylindrical gas supply conduit 62 by extending the conduit 62 into close running fit with a relatively deep circular groove 63 formed in the edge of the hub cylindrical wall 11. In this way a substantially sealed running joint is formed coaxial with the hub mounting ring 9. The cylindrical gas supply conduit 62 may be provided with a lateral inlet conduit 64 which may be connected to receive gases, either hot or cool and at either super- or subatmospheric pressure for discharge into the hollow hub 1 of the propeller through the spaces between the ribs or vanes 10 that constitute the axial flow fan or blower previously described.

As shown in Fig. 2, the blade pitch is controlled by angularly positioning the tubular stub shaft 22 in the socket 3 through the agency of an improved internal pitch control mechanism comprising the offset crank arm 65 carrying a pin 66 and roller 67 for engaging with the radial slot 68 formed in one arm of the reciprocating operating yoke 69. The two arms of the T-shaped operating yoke 69 extend diametrically between the cylindrical wall 11 of the propeller hub 1 and slide in suitable bearing slots 70, 71 formed therein. The T-shaped yoke 69 has the central axially extending portion 72 suitably connected as by welding with the operating tube 73 that extends axially inside the hollow drive shaft 12 and carries the ball thrust bearing units 74—75 on the opposite sides of the swivel control disc 76. The swivel disc 76 is carried by a control screw 77 having threaded engagement with the stationary nut 78. Thus, upon opposite rotation of the screw 78 by suitable control means such as the gearing 79, which if desired may be motor driven, the swivel disc 76 is moved axially in opposite directions so as to correspondingly reciprocate the operating tube 73 and the operating yoke 69 transverse the axis of the stub shaft 22. In this way the offset crank arm 65 and pin 66 may be angularly positioned as the roller 67 rides in the slot 68 of the yoke arm 69 without appreciably restricting the path for the flow of gases through the hollow hub 1 into the blade 7.

The opposing propeller hub socket 4 carries an articulated conduit variable pitch pivot connection 6 for blade 8 of exactly the same construction as that described above for blade 7 with the pitch control crank arm 80 and roller pin 81 operating in the slot 82 formed in the T-shaped operating yoke 69 on the opposite side of the axis of the propeller hub 1 from the slot 68. Thus when the operating yoke 69 is moved in either direction, the propeller blades 7 and 8 are rotated in opposite directions an equal amount so as thereby correspondingly to vary the pitch of the two propeller blades 7 and 8. The reciprocating movement of swivel disc 76 required to vary the blade pitch may be provided by any suitable means such as a simple manually operated lever or a rack and pinion mechanism instead of the threaded control screw 77, if desired.

The improved lightweight hollow conduit propeller blade construction shown in Fig. 3 is obtained by surrounding the parallel spaced apart blade tension members 40 and 41 with a relatively thin walled corrugated surface skin or envelope 83 suitably secured thereto, preferably by welding, and formed into suitable aerodynamic shape for lifting and propelling the aircraft efficiently. As indicated in Fig. 4, the blade thickness preferably is tapered and each of the blade tension members 40 and 41 correspondingly may be tapered, as indicated in the sectional views of Figs. 5, 6 and 8, since they inherently transmit the blade lifting and propelling forces to the propeller rotor hub 1 as pure tension.

As shown in Figs. 3 and 4, the thin blade skin or envelope 83 is in accordance with the present invention provided with a series of complementary corrugations 84 of streamlined air flow form. These blade corrugations 84 substantially follow a radius equal to the distance of the corrugation from the axis of the propeller hub 1 near the hub with the corrugation curve segment progressively sloping inwardly adjacent the blade tip, as shown, so as thereby to conform substantially with the varying lines of air flow transverse the blade. As shown in the sectional view of Fig. 5 taken on the section line 5—5 of Fig. 3, the blade skin or envelope 83 is preformed, preferably by means of suitable dies, into an upper section 85 and a complementary lower section 86 with the complementary corrugations 84 at the leading end of each section gradually flattened out so that the two sections may be joined together, preferably by line welding, as indicated, to present a substantially smooth leading edge 87 for the blade. At the trailing edge of the blade, the complementary corrugations 84 also are gradually flattened out except adjacent the tip so as to provide a smooth edge section 88 for both the upper and lower sections which may be joined together, preferably by line welding, as indicated in Fig. 5. Furthermore, after the tension members 40 and 41 are inserted into the preformed envelope 83, each of the corrugations 84 may be secured at its engaging portion with each of the tension members 40, 41, preferably by spot welding, as indicated. This results in a very strong yet lightweight blade structure having a tapering tortional flexibility to increase the blade efficiency and power in variable pitch service.

In the outer blade section adjacent the tip, as shown in Fig. 6, taken on the dash line 6—6 of Fig. 3, the complementary skin corrugations 84 are fully extended to the trailing edge of the blade and are joined together to provide a series of rearwardly directed jet discharge openings 89 adjacent the tip of the wing, as indicated in the enlarged view of Fig. 7. In this construction, the inner adjacent portion 90 of each corrugation is joined to the corresponding inner portion 91 of the opposite complementary corrugation, preferably by spot welding, as indicated, while the spaced apart opposing complementary corrugations 84 form the jet discharge openings 89. The gases flow to the jet openings 89 through the inside of the corrugations 84 that provide multiple passages along the opposite edges of the tension member 41 with these multiple passages jointly providing a relatively large gas flow area.

The tip of the wing may be sealed by the channel member 92, if desired, so that a substantial gas pressure will be built up due to the centrifugal action on the gas inside the rotating blade to produce a relatively strong jet discharge from the series of jet openings 89 formed in the trailing edge of the wing adjacent the tip. However, a series of openings or slots 93 preferably are formed in the blade tip sealing member 92 for discharging some of the gas radially outwardly under pressure to suppress the air curl usually present at the tip of a propeller blade, and in this way also increase the blade efficiency and lifting power.

As shown in Fig. 9, two similar propellers 94 and 95, each embodying the improvements of the present invention, as above described, are driven by the air-cooled internal combustion engine 96 through suitable gearing 97 preferably so as to rotate in opposite directions. The exhaust manifold 98 of the propeller driving engine 96 may be connected to the hub gas inlet conduit 64 of propeller 95 in order to enable the rotating blades thereof to produce by centrifugal force a suction on manifold 98 that will serve to decrease the engine exhaust back pressure and thereby increase the engine operating efficiency while, at the same time, producing a trailing edge jet propulsion action tending to rotate the propeller blades as well as a radial jet discharge tending to increase the blade efficiency. The inlet conduit 64 of propeller 94 may be connected with the engine air cooling jacket 99 so as to draw air therefrom and thereby enable the centrifugal action of the left-hand propeller blades to produce a forced flow of cooling air over the engine 96 even though the aircraft is stationary while at the same time increasing the blade jet rotation forces and tip efficiency as indicated above.

What I claim as new and desire to secure by Letters Patent of the United States, is:

1. An aircraft variable pitch propeller having, in combination, a hollow rotor having a radial thrust bearing socket formed therein, a radial thrust and flow tube rotatable in said socket and having an offset crank extending from the inner end thereof, a hollow propeller blade having jet discharge means adjacent the tip thereof and having pivotal mounting and flow connections with the outer end of said tube, and means including a reciprocating swivel member extending axially inside said hub for rotation therewith and having a slotted arm extending therefrom for rotating said crank to control the pitch of said blade.

2. An aircraft variable pitch propeller having, in combination, a hollow hub having a pair of radial thrust bearing sockets formed in opposing alignment in the side walls thereof, a pair of radial thrust and flow tubes each rotatable in a corresponding socket and having an offset crank extending from the inner end thereof, a pair of hollow propeller blades, each having jet discharge means adjacent the tip thereof and having pivotal thrust and flow connections with the outer end of a corresponding tube, and means including a swivel yoke member extending inside said hub for rotation therewith and having a pair of slots for engaging with and rotating said cranks in opposite directions to control the pitch of said blades.

3. An aircraft variable pitch propeller having, in combination, a tubular drive shaft, a hollow propeller hub carried by said shaft and having a plurality of radial thrust bearing sockets formed in the side walls thereof, a separate tubular shaft for each socket and having an offset crank extending from the inner end thereof for rotating said shaft, a hollow propeller blade for each shaft having jet discharge means adjacent the tip and having yielding pivotal lost motion mounting and flow connections with the outer end of said shaft, an operating member mounted for axial reciprocation inside said hub and rotation therewith, and having slots for engaging with and rotating said cranks to control the pitch of said blades, and means operating through said tubular drive shaft for reciprocating said member.

4. An aircraft variable pitch propeller having, in combination, a hollow hub having a radial thrust bearing and internal and external sockets formed in axial alignment therewith, a tubular shaft rotatable in said socket and having an offset crank extending from the inner end thereof and a shoulder for engaging said thrust bearing, a hollow blade having a pair of spaced apart tension members pivotally connected with the outer end of said shaft, means including a flow tube extending between said members and having an articulation at each end thereof for providing a substantially sealed gas flow passage between said tubular shaft and said blade, and means including an operating member reciprocating inside said hub and having a slot for rotating said crank to control the pitch of said blade.

5. An aircraft variable pitch propeller having, in combination, a hub, a radially extending pitch control shaft rotatable in said hub, a propeller blade having a pair of spaced apart axially aligned lost motion pivotal connections with the outer end of said shaft, and means including a compression element for resiliently taking up the lost motion in said pivotal connections to control the rotational flutter of said blade.

6. An aircraft variable pitch propeller having, in combination, a hollow blade provided with a dicharge opening adjacent the tip thereof and having a pair of spaced apart tension members extending from the inner end thereof and a flow inlet tube extending therebetween, a hollow rotor having a radial thrust and flow outlet tube rotatable therein to control the pitch of said blade and provided with a lost motion pivot connection with each of said tension members, an articulated flow conduit interconnecting said flow outlet tube with said inlet tube of said blade, and a compression spring interposed between said tubes for resiliently taking up the lost motion of said pivot connections to control the rotational flutter of said blade.

7. An aircraft propeller having, in combination, a hub shell having a radial thrust bearing socket formed therein, a tubular blade pitch control and flow shaft rotatably mounted in said socket, a pair of pivot pins removably mounted in opposing spaced apart relation at the outer ends of said shaft, a hollow blade having a discharge opening adjacent the tip thereof and a pair of tension supporting members, each having a lost motion bearing for receiving a corresponding one of said pins, a blade inlet tube extending between said members and secured thereto for holding said members in aligned spaced apart relation, a coiled compression spring interposed between said tube and said shaft for resiliently taking up each of said lost motion bearings, and an interconnecting flow tube extending through said spring between said shaft and said tube and having a sliding ball joint flow connection therewith.

8. An aircraft pivotally mounted propeller blade having, in combination, a pair of spaced apart blade tension beams, each having a separate lost motion pivotal mounting means adjacent the inner end thereof for carrying the centrifugal tension of the blade, means including a spring for resiliently taking up each of said lost motion means, a truss member disposed between said tension beams adjacent said mounting means and secured to said tension beams for maintaining said beams in alignment while transferring tension from each of said beams to the other, and a blade surface envelope for substantially enclosing said beams and carried thereby.

9. An aircraft pivotally mounted propeller blade having, in combination, a pair of outwardly tapering blade tension members, each having a separate lost motion pivotal mounting means adjacent the inner end thereof for alternately carrying the centrifugal tension of the blade, a truss and flow tube disposed between said tension members adjacent said mounting means and secured to said tension members for transferring tension from each of said members to the other, and a preformed tapering blade surface envelope communicating with said tube and substantially enclosing said members and secured thereto and having corrugations forming lateral jet discharge openings adjacent the blade tip and flow passages transverse said members.

10. An aircraft propeller blade having, in combination, a pair of spaced apart blade tension members having articulate pivotal and rotational mounting means at the inner end thereof, and a relatively thin blade surface envelope substantially enclosing said members and secured thereto and having an articulate flow inlet between said members and corrugations providing flow passages transverse said members.

11. An aircraft variable pitch propeller having in combination a hollow rotor hub having an axial flow inlet, a flow discharge tube rotatably mounted in a lateral wall of said rotor hub, pitch control means connected with said tube for rotating said tube, a hollow propeller blade provided with a discharge opening adjacent the tip thereof and having a pair of spaced apart pivotal mounting connections with the outer end of said tube for pivotally supporting said blade on said tube to vary the pitch of said blade upon rotation of said tube, and means including an articulate tubular flow conduit extending between said blade and said tube in the space between said spaced apart pivotal blade mounting connections for conducting the flow discharged from said rotor hub through said tube into said blade.

12. An aircraft variable pitch propeller having in combination a hollow rotor hub provided with an axial flow inlet and a radial socket outlet, a flow discharge tube having radial thrust bearing means for rotatably mounting said tube in said socket outlet, pitch control means for rotating said tube, a hollow propeller blade provided with a fluid discharge opening adjacent the tip thereof and having a pair of spaced apart pivotal mounting connections with the outer end of said tube for varying the pitch of said blade upon rotation of said tube, and means including a conduit having an articulate telescoping connection with said tube and extending between said spaced apart pivotal mounting connections for conducting fluid discharged from said rotor through said tube to said blade.

13. In combination, a hollow propeller hub casing provided with an open radial socket, axial mounting means for said hub providing for fluid flow into said casing, a flow discharge tube rotatably mounted in said socket, a hollow propeller blade having a fluid discharge opening adjacent the tip thereof and having pivotal mounting connections with said flow discharge tube for articulation between said blade and said hub, means inside said hub casing for rotating said tube to adjust the pitch of said blade, and means including a conduit having a ball joint connection at each end thereof; one with said flow tube and the other with said blade for conducting fluid discharged from said hub through said tube into said blade.

14. In combination a hollow propeller blade having an axial flow inlet at the root thereof and provided with a jet discharge opening adjacent the tip thereof, a hollow rotor having an axial flow inlet, a tubular pitch control shaft extending through and rotatably mounted in a lateral wall of said hollow rotor for discharging fluid laterally therefrom and having pivotal mounting connections with said blade and articulate flow connections with said flow inlet of said blade, and means including a member reciprocating inside said rotor for rotating said pitch control shaft to control the pitch of said blade.

15. An aircraft variable pitch propeller having, in combination, a hollow blade provided with a discharge opening adjacent the tip thereof and having a pair of blade tension beams extending in aligned spaced apart opposition from the inner end thereof and a flow inlet between said beams, a hollow rotor hub having a flow inlet, an outlet flow tube rotatably mounted in a lateral wall of said rotor hub and provided with a separate pivot connection with each of said tension members jointly to control the pitch of said blade, and an articulate conduit interconnecting said flow inlet of said blade with said outlet flow tube and extending between said pivot connections.

16. An aircraft propeller blade having, in combination, a pair of spaced apart longitudinal blade tension beams, articulate pivotal and rotational blade pitch control means at the inner ends of said beams including a separate pivot pin for each beam and a rotatable blade pitch control shaft having means for removably mounting said pivot pins in alignment, and a blade surface envelope substantially enclosing said beams and secured thereto.

17. An aircraft jet propelled blade having, in combination, a pair of longitudinal blade tension beams, a tubular flow inlet member interconnecting the inner ends of said beams for maintaining said beams in spaced apart alignment, articulate pivotal and rotational blade pitch control means as the inner ends of said beams including a separate pivot pin for each beam and a rotatable blade pitch control shaft having means for removably mounting said pins in alignment, and a blade surface envelope enclosing said beams and secured thereto and having corrugations providing flow passages transverse said beams.

WILLIAM DALTON.

REFERENCES CITED

The following references are of record in the file of this patent:

UNITED STATES PATENTS

| Number | Name | Date |
| --- | --- | --- |
| 958,009 | Reissner | May 17, 1910 |
| 1,424,672 | Orgissek | Aug. 1, 1922 |
| 1,462,704 | Junkers | July 24, 1923 |
| 1,715,427 | Pitcairn | June 4, 1929 |
| 1,742,938 | Schumann | Jan. 7, 1930 |
| 1,899,689 | Hauston | Feb. 28, 1933 |
| 1,927,592 | Lambert | Sept. 19, 1933 |
| 1,995,460 | Pecker | Mar. 26, 1935 |
| 2,021,481 | Dornier | Nov. 19, 1935 |
| 2,163,893 | Schairer | June 27, 1939 |
| 2,216,163 | Ray | Oct. 1, 1940 |
| 2,245,251 | Chilton | June 10, 1941 |
| 2,371,687 | Gerhardt | Mar. 20, 1945 |

FOREIGN PATENTS

| Number | Country | Date |
| --- | --- | --- |
| 416 | Great Britain | 1871 |
| 12,846 | Great Britain | 1909 |
| 256,724 | Great Britain | Aug. 19, 1926 |
| 556,865 | Great Britain | Oct. 26, 1943 |
| 656,956 | France | May 15, 1929 |
| 687,481 | France | Aug. 8, 1930 |